US012131874B2

(12) United States Patent
Hou et al.

(10) Patent No.: US 12,131,874 B2
(45) **Date of Patent: *Oct. 29, 2024**

(54) KEYSWITCH SUPPORT CONNECTION STRUCTURE AND KEYSWITCH STRUCTURE THEREWITH

(71) Applicant: DARFON ELECTRONICS CORP., Taoyuan (TW)

(72) Inventors: Po-Chun Hou, Taoyuan (TW); Chin-Hung Lin, Taoyuan (TW); Liang-Ta Yeh, Taoyuan (TW); Ling-Hsi Chao, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 333 days.

This patent is subject to a terminal disclaimer.

(21) Appl. No.: 17/216,707

(22) Filed: Mar. 30, 2021

(65) Prior Publication Data

US 2021/0304979 A1 Sep. 30, 2021

Related U.S. Application Data

(60) Provisional application No. 63/061,143, filed on Aug. 4, 2020, provisional application No. 63/046,705, filed (Continued)

(30) Foreign Application Priority Data

Nov. 5, 2020 (TW) ................................ 109138587
Mar. 10, 2021 (TW) ................................ 110108410

(51) Int. Cl.
*H01H 13/14* (2006.01)
*H01H 3/12* (2006.01)

(Continued)

(52) U.S. Cl.
CPC .............. *H01H 13/14* (2013.01); *H01H 3/12* (2013.01); *H01H 13/10* (2013.01); *H01H 13/705* (2013.01)

(58) Field of Classification Search
CPC .......... H01H 13/14; H01H 3/12; H01H 13/10; H01H 13/705; H01H 2209/01; H01H 3/125; H01H 13/7065

(Continued)

(56) References Cited

U.S. PATENT DOCUMENTS 6,225,586 B1 5/2001 Watanabe
8,057,722 B2 11/2011 Liang (Continued)

FOREIGN PATENT DOCUMENTS

CN 2682562 Y 3/2005
CN 201029081 Y 2/2008

(Continued)

OTHER PUBLICATIONS

Hou, the specification, including the claims, and drawings in the U.S. Appl. No. 17/216,717, filed Mar. 30, 2021.

(Continued)

*Primary Examiner* — Lheiren Mae A Caroc
(74) *Attorney, Agent, or Firm* — Winston Hsu

(57) ABSTRACT

A keyswitch support connection structure incudes a bottom plate portion, a cantilever plate, and a joining portion. The cantilever plate extends upward from a joining hole of the bottom plate portion and has a holding structure. The joining portion and the joining hole are firmly engaged with each other. The joining portion encapsulates the holding structure. The joining portion and the bottom plate portion jointly form or the joining portion alone forms a support connection portion. A keyswitch structure includes a base, a keycap above the base, and first and second keyswitch supports (Continued)

connected to and between the keycap and the base. The base includes the above keyswitch support connection structure. The first keyswitch support is rotatably connected to the support connection portion.

16 Claims, 16 Drawing Sheets

Related U.S. Application Data on Jul. 1, 2020, provisional application No. 63/005,473, filed on Apr. 6, 2020, provisional application No. 63/002,378, filed on Mar. 31, 2020.

(51) Int. Cl.
*H01H 13/10* (2006.01)
*H01H 13/705* (2006.01)

(58) Field of Classification Search
USPC .......................................... 200/341, 344, 345
See application file for complete search history.

(56) References Cited

U.S. PATENT DOCUMENTS

| | | | |
|---|---|---|---|
| 8,207,465 B2 | 6/2012 | Maruyama | |
| 8,759,698 B2 | 6/2014 | Chiba | |
| 9,899,157 B1 | 2/2018 | Yen | |
| 10,714,277 B2 | 7/2020 | Lin | |
| 10,886,079 B1 | 1/2021 | Li | |
| 10,903,024 B1 | 1/2021 | Liu | |
| 11,424,090 B2 * | 8/2022 | Hou | H01H 3/12 |
| 2015/0318125 A1 | 11/2015 | Hu | |
| 2017/0004937 A1 | 1/2017 | Leong | |
| 2020/0273642 A1 * | 8/2020 | Yen | G06F 1/169 |
| 2022/0189714 A1 * | 6/2022 | Hou | H01H 13/14 |

FOREIGN PATENT DOCUMENTS

| | | |
|---|---|---|
| CN | 101661846 A | 3/2010 |
| CN | 202796583 U | 3/2013 |
| CN | 103383902 A | 11/2013 |
| CN | 104124091 A | 10/2014 |
| CN | 204632606 U | 9/2015 |
| CN | 205487883 U | 8/2016 |
| CN | 107492461 A | 12/2017 |
| CN | 206931507 U | 1/2018 |
| CN | 207637677 U | 7/2018 |
| CN | 207938500 U | 10/2018 |
| CN | 108933054 A | 12/2018 |
| CN | 109065392 A | 12/2018 |
| CN | 109767946 A | 5/2019 |
| CN | 209266263 U | 8/2019 |
| CN | 107658155 B | 11/2019 |
| CN | 110444431 A | 11/2019 |
| CN | 211858484 U | 11/2020 |
| CN | 112117145 A | 12/2020 |
| CN | 112151294 A | 12/2020 |
| JP | 2000-48665 A | 2/2000 |
| TW | M292723 | 6/2006 |
| TW | I494963 B | 8/2015 |
| TW | M551337 U | 11/2017 |
| TW | 201805978 A | 2/2018 |
| TW | 201903804 A | 1/2019 |
| TW | I669737 B | 8/2019 |
| TW | 201939551 A | 10/2019 |
| TW | I683331 B | 1/2020 |
| TW | I686829 B | 3/2020 |

OTHER PUBLICATIONS

Hou, the specification, including the claims, and drawings in the U.S. Appl. No. 17/684,441, filed Mar. 2, 2022.

* cited by examiner

KEYSWITCH SUPPORT CONNECTION STRUCTURE AND KEYSWITCH STRUCTURE THEREWITH

CROSS REFERENCE TO RELATED APPLICATIONS

This application claims the benefit of U.S. Provisional Application No. 63/002,378 filed on Mar. 31, 2020, Application No. 63/005,473 filed on Apr. 6, 2020, Application No. 63/046,705 filed on Jul. 1, 2020, and Application No. 63/061,143 filed on Aug. 4, 2020 which are incorporated herein by reference.

BACKGROUND OF THE INVENTION

1. Field of the Invention

The present invention relates to a keyswitch structure, and more particularly to a keyswitch support connection structure of a keyswitch structure.

2. Description of the Prior Art

A keyboard keyswitch structure of general notebooks usually uses a scissors-type support for providing a supporting and lifting mechanism for its keycap. For saving space, the structure bottom plate is usually used directly to form a structure which is used for connecting with the support, so that the support can be rotatably connected to the bottom plate. The bottom plate is generally formed by stamping a metal plate to form the connection structure. However, the dimensional accuracy of the connection structure bent through the method is not easy to control, and the strength of the connection structure and the surface area in contact with the support are limited by the thickness of the metal plate, which affects the stability of operation of the keyswitch structure operation. When the keyswitch structure is reduced in size, the above problem gets worse. Another method is to form a connection structure on the bottom plate by insert molding, for connecting with the support. In principle, the joining strength between the connection structure and the bottom plate is achieved through structural interlocking. When the keyswitch structure is reduced in size, the size of the connection structure will be smaller. It is difficult to maintain the joining strength between the connection structure and the bottom plate. Plastic materials are usually softer than metal bottom plates. During replacing the keycap and the support, the connection structure will be pulled by the support and the bottom plate, which makes the plastic connection structure easy to deformed or even broken, and cannot be used again.

SUMMARY OF THE INVENTION

An objective of the invention is to provide a keyswitch support connection structure, which uses an upwardly-extending cantilever plate to increase the structural joining strength.

A keyswitch support connection structure according to the invention includes a bottom plate portion, a cantilever plate, and a joining portion. The bottom plate portion has a joining hole. The cantilever plate is a single-planar structure, extends upward from the joining hole, and has a holding structure. The joining portion and the joining hole are firmly engaged with each other. The joining portion encapsulates the holding structure. The joining portion and the bottom plate portion jointly form or the joining portion alone forms a support connection portion. Therein, the cantilever plate itself can increase the surface area in contact with the joining portion, and the holding structure can increase the degree of structural interference with the joining portion. Both can increase the joining strength of the joining portion with the bottom plate portion and the cantilever plate, which helps to maintain the structural stability of the support connection portion.

Another objective of the invention is to provide a keyswitch structure, which has a structure like the above keyswitch support connection structure and can increase the joining strength of the joining portion with the bottom plate portion.

A keyswitch structure according to the invention includes a base, a keycap, a first keyswitch support, and a second keyswitch support. The base includes a keyswitch support connection structure. The keycap is disposed above the base. The first and second keyswitch supports are connected to and between the keycap and the base. The keycap is vertically movable relative to the base through the first keyswitch support and the second keyswitch support. The keyswitch support connection structure includes a bottom plate portion, a cantilever plate, and a joining portion. The bottom plate portion has a joining hole. The cantilever plate is a single-planar structure, extends upward from the joining hole, and has a holding structure. The joining portion and the joining hole are firmly engaged with each other. The joining portion encapsulates the holding structure. The joining portion and the bottom plate portion jointly form or the joining portion alone forms a support connection portion. The first keyswitch support is rotatably connected to the support connection portion. Therein, the keyswitch support connection structure can use the upwardly-extending cantilever plate or the wing portion of the joining to increase the joining strength of the joining portion with the bottom plate portion, which helps to maintain the structural stability of the support connection portion.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
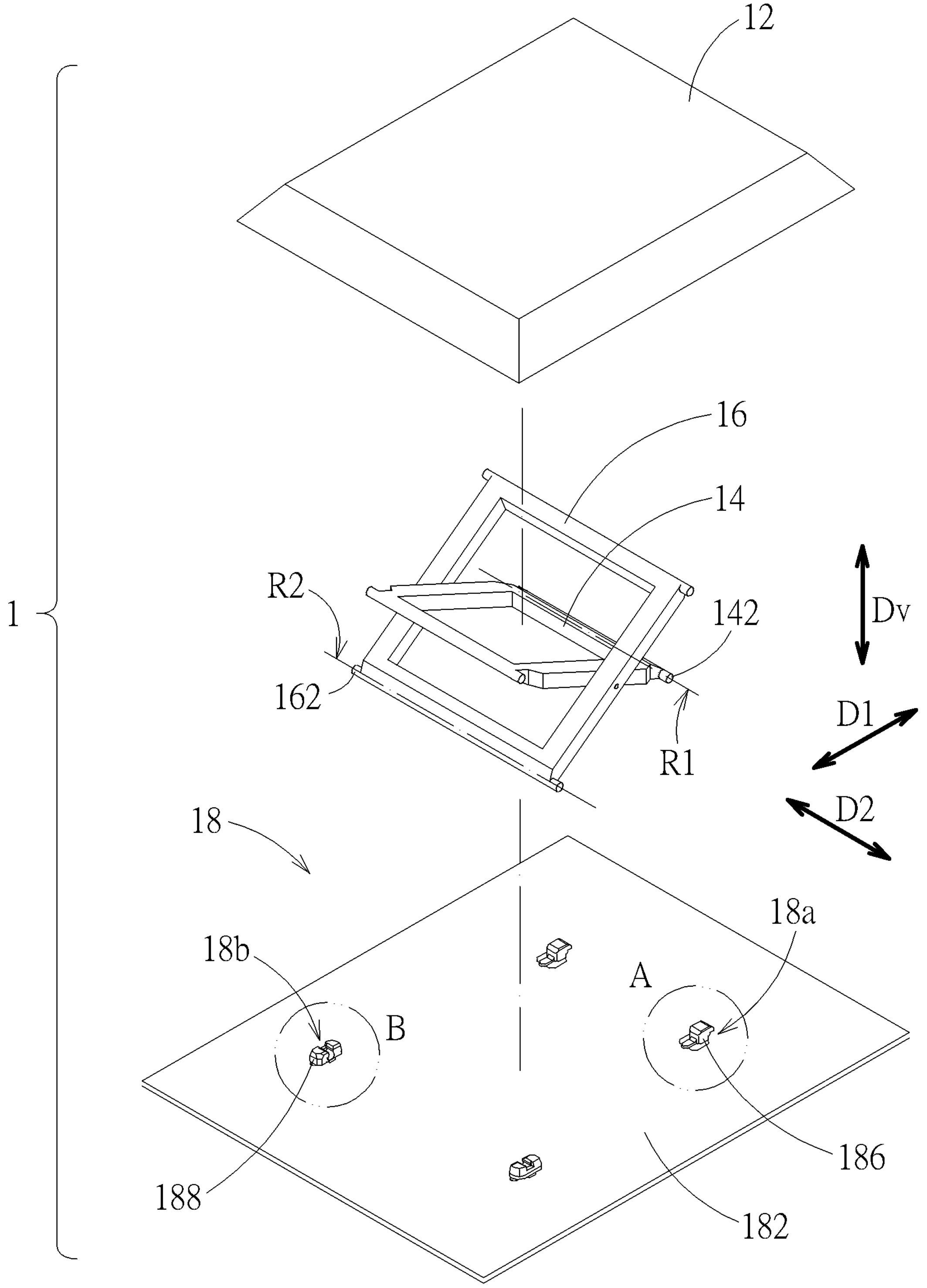
FIG. 1 is an exploded view of a keyswitch structure according to a first embodiment.

Please refer to FIG. 1. A keyswitch structure 1 according to a first embodiment includes a keycap 12, a first keyswitch support 14, a second keyswitch support 16, and a base 18. The keycap 12 is disposed above the base 18. Both the first keyswitch support 14 and the second keyswitch support 16 are connected to and between the keycap 12 and the base 18, so that the keycap 12 can move vertically relative to the base 18 (or move parallel to a vertical direction Dv, indicated by a double-headed arrow in the figure) through the first keyswitch support 14 and the second keyswitch support 16. Therein, the base 18 includes two support connection portions 18*a* and two support connection portions 18*b*. The first keyswitch support 14 is rotatably and slidably connected to the base 18 through the support connection portion 18*a*. The second keyswitch support 16 is rotatably connected to the base 18 through the support connection portion 18*b*.

Please also refer FIG. 2 to FIG. 5. For the support connection portion 18*a* that is connected with the first keyswitch support 14, the base 18 includes a bottom plate portion 182, a cantilever plate 184, and a joining portion 186. The first keyswitch support 14 is rotatably and slidably connected to the bottom plate portion 182 of the base 18 through the support connection portion 18*a*. The second keyswitch support 16 is rotatably connected to the bottom plate portion 182 of the base 18 through the support connection portion 18*b*. The bottom plate portion 182 has a joining hole 1822. The cantilever plate 184 herein is a single-planar structure with a substantially vertical middle line, and single-bended extends upward from an edge of the joining hole 1822 and has a holding structure 1842 (indicated by a frame in chain lines in FIG. 3 and FIG. 5). The joining portion 186 and the joining hole 186 are firmly engaged with each other. The joining portion 186 encapsulates the holding structure 1842. The joining portion 186 and the bottom plate portion 182 jointly form the support connection portion 18*a*. Therein, the combination of the bottom plate portion 182, the cantilever plate 184, and the joining portion 186 can be regarded as one keyswitch support connection structure 180*a*, used for connecting with the first keyswitch support 14.

In the first embodiment, the cantilever plate 184 has a fixed end 184*b* and a free end 184*a*. The cantilever plate 184 is fixed to the bottom plate portion 182 through the fixed end 184*b*. The holding structure 1842 is a necking portion of the cantilever plate 184 between the fixed end 184*b* and the free end 184*a*. The necking portion can increase the surface area of the cantilever plate 184 in contact with the joining portion 186 and the degree of structural interference with the joining portion 186. The bottom plate portion 182 and the cantilever plate 184 are formed by the same pressing part. For example, a metal plate is pressed to form the bottom plate portion 182 and the cantilever plate 184 at the same time. In structural logic, the cantilever plate 184 is formed by bending a portion of the bottom plate portion 182 upward and extending it. The joining portion 186 is an injection part, e.g. formed by plastic injection moulding (inserting the bottom plate portion 182 together with the cantilever plate 184 and injecting plastic).

Figure 4:
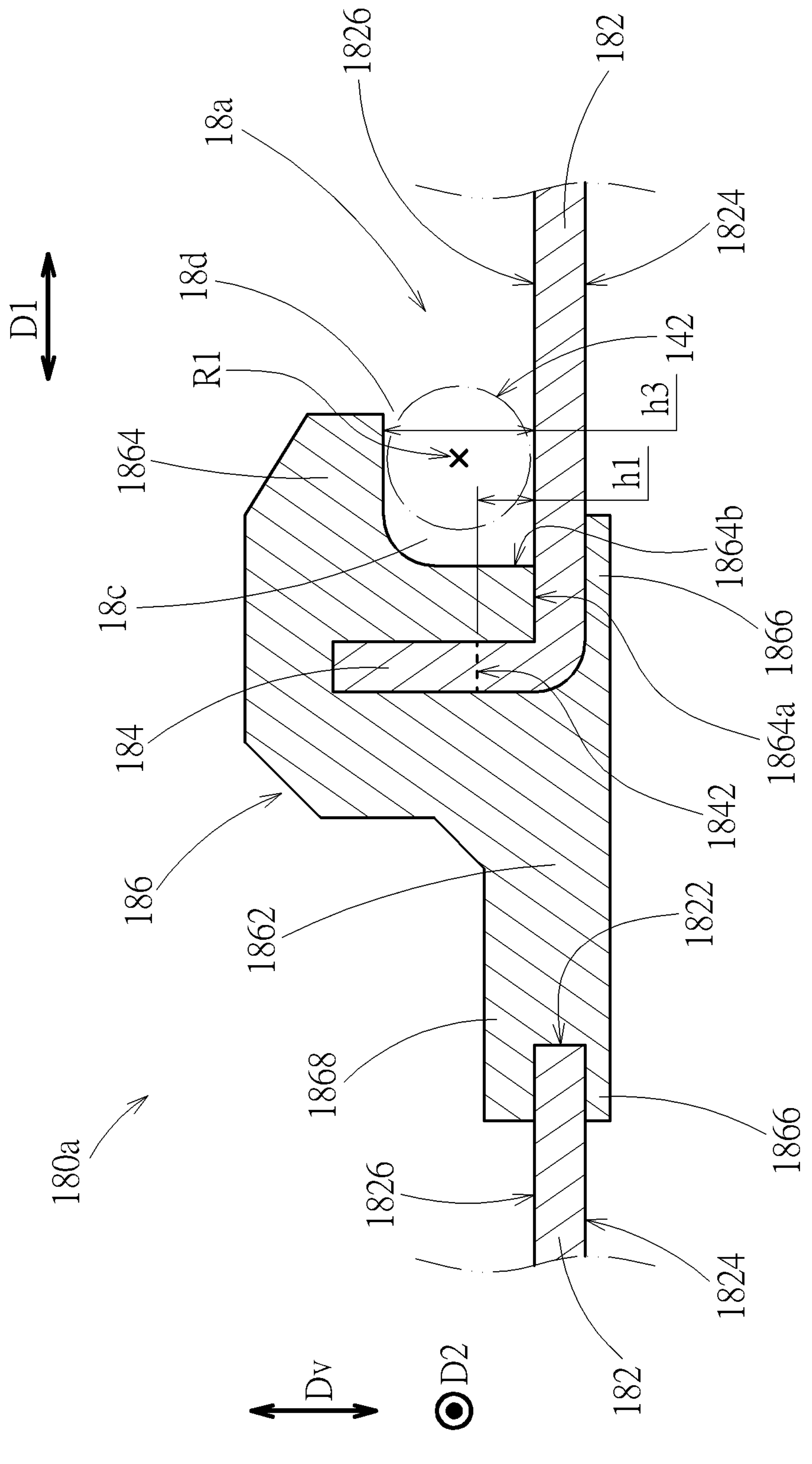
FIG. 4 is a sectional view of the base along the line X-X in FIG. 2.
Figure 5:
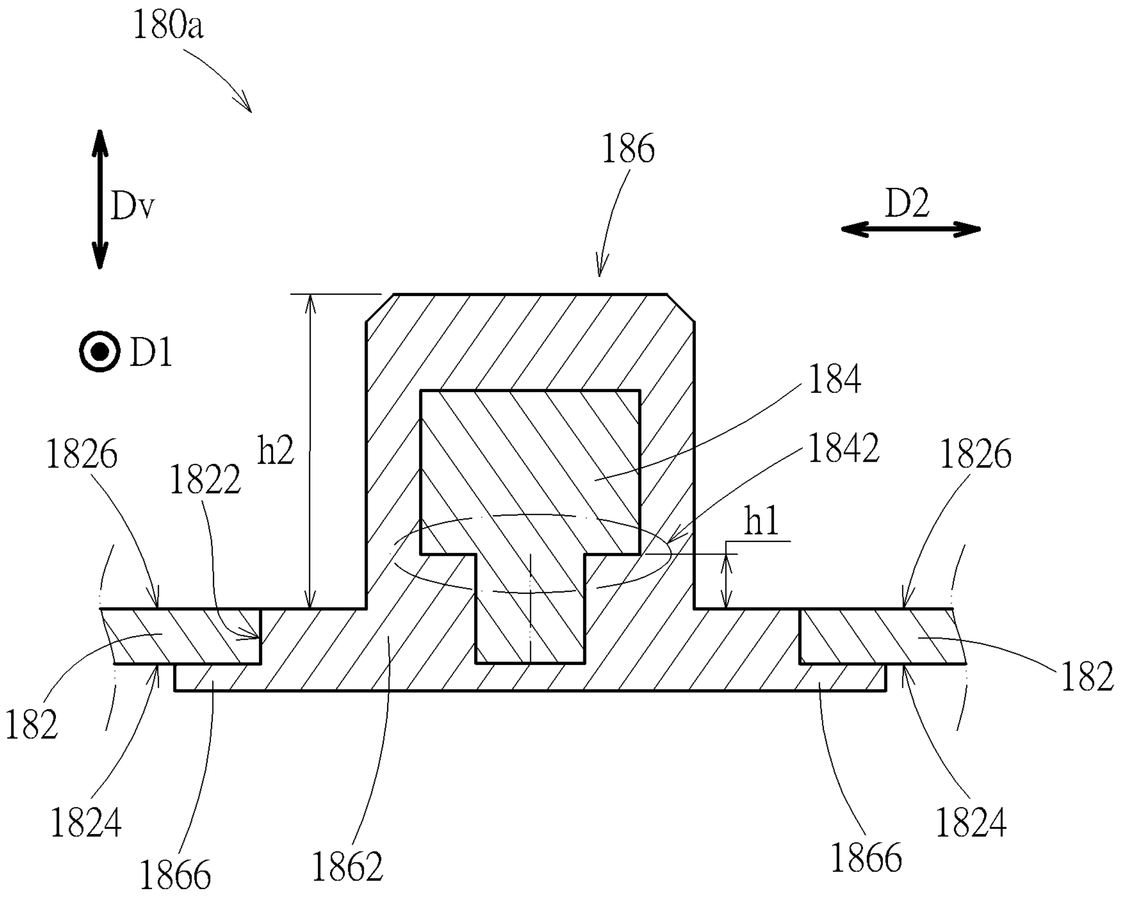
FIG. 5 is a sectional view of the base along the line Y-Y in FIG. 2.

The support connection portion 18*a* has a sliding slot 18*c*. Basically the cantilever plate 184 has its plane facing the sliding slot 18*c*. The sliding slot 18*c* extends in a first direction D1 (indicated by a double-headed arrow in the figures) parallel to the bottom plate portion 182 and has an opening 18*d*. The opening 18*d* is used for a base connection portion 142 of the first keyswitch support 14 (which is indicated by a chain circle in FIG. 4) to enter the sliding slot 18*c*, so as to be slidably connected with the support connection portion 18*a* in the first direction D1. The base connection portion 142 of the first keyswitch support 14 also can rotate around a rotation axis R1 (indicated by a chain line in FIG. 1 and by a cross mark in FIG. 4) perpendicular to the first direction D1 and the vertical direction Dv in the sliding slot 18*c*. The rotation axis R1 is parallel to a second direction D2 (indicated by a double-headed arrow in the figures). Furthermore, the joining hole 1822 has two opposite side edges 1822*a* and 1822*b* in the first direction D1. The cantilever plate 184 extends upward from the side edge 1822*a* (which is closer to the opening 18*d* than the side edge 1822*b*). In the view point of FIG. 4, the opening 18*d* faces rightward. The cantilever plate 184 extends upward from the right side edge of the joining hole 1822. The center position of the first keyswitch support 14 is located at the left side of the support connection portion 18*a*. When the first keyswitch support 14 is driven to move upward (e.g., by the keycap 12 moving upward to drive the first keyswitch support 14), the base connection portion 142 will pull the joining portion 186 up and to the left. The above structural configuration can increase the resistance of the cantilever plate 184 to this pulling force (i.e., increasing the overall structural strength of the keyswitch support connection structure 180*a*). In addition, in the embodiment, as shown by FIG. 5, the height h1 of a middle line (indicated by a chain line in FIG. 5) for the holding structure 1842 is not higher than 50% of the height h2 of the joining portion 186; as shown by FIG. 4, the height h1 for the holding structure 1842 (the hidden profile of which is shown by a dashed line) is not higher than a half of a slot height h3 of the sliding slot 18*c* (which is roughly equal to that the height h1 is not higher than the rotation axis R1).

The joining portion 186 includes an embedded portion 1862, a hook portion 1864, a wing portion 1866, and a rib 1868. The bottom plate portion 182 has a bottom surface 1824 and an upper surface 1826 opposite to the bottom surface 1824 in the vertical direction Dv. The joining hole 1822 passes through the bottom surface 1824 and the upper surface 1826. The embedded portion 1862 fills up the joining hole 1822 and is coplanar with the upper surface 1826. The embedded portion 1862 is integrally connected with the wing portion 1866 downward and is integrally connected with a bottom end 1864*a* of the hook portion 1864 and the bottom of the rib 1868 upward. The hook portion 1864 is inverted L-shaped. The hook portion 1864 and the upper surface 1826 jointly form the support connection portion 18*a*, so the support connection portion 18*a* is located on the side of the upper surface 1826. The sliding slot 18*c* of the support connection portion 18*a* is jointly defined by an inverted L-shaped wall surface 1864*b* of the hook portion 1864 of the joining portion 186 and the upper surface 1826 of the bottom plate portion 182 adjoining the wall surface

1864b. As described above, the sliding slot 18c has an opening 18d in the first direction D1, and the sliding slot 18c and the hook portion 1864 are also open on opposite sides in the second direction D2. The wing portion 1866 protrudes from the bottom surface 1824 and covers a portion of the bottom surface 1824 (or extends on the bottom surface 1824). The rib 1868 is located at the back side of the hook portion 1864 (i.e., the side opposite to the opening 18d). The width of the rib 1868 can be selectively not greater than the width of the hook portion 1864 or the width of the joining portion 186. The rib 1868 extends outward parallel to the first direction D1 beyond the side edge 1822b of the joining hole 1822. The rib 1868 extends at least partially to cover the upper surface 1826 of the bottom plate portion 182. Similarly the height of the rib 1868 can be selectively not greater than 75% the total height of the joining portion 186.

The wing portion 1866 is conducive to not only increasing the bonding strength between the joining portion 186 and the bottom plate portion 182, but also aiding the joining portion 186 in resisting separating from the bottom plate portion 182 (e.g., when the base connection portion 142 of the first keyswitch support 14 pulls the joining portion 186 upward and to the left). In order to prevent the joining portion 186 from being partially upwardly deformed or overturned when pulled by an external force, the rib 1868 is provided to help increase the overall structural strength of the joining portion 186, so that when the joining portion 186 is subjected to the upward external force, the rib 1868 can abut against the side edge 1822b of the joining hole 1822 and the portion of the upper surface 1826 adjacent to the side edge 1822b. It also helps the joining portion 186 to resist separating from the bottom plate portion 182. Besides, the bottom end 1864a of the hook portion 1864 at least partially extends and covers the upper surface 1826 of the bottom plate portion 182 beside the joining hole 1822. Thereby, before being deformed or turned over by an upward external force, the joining portion 186 can abut against the hole wall of the joining hole 1822 and the portion of the upper surface 1826 adjacent to the hole wall through the bottom end 1864a of the hook portion 1864, so as to avoid separating from the bottom plate portion 182.

Furthermore, in the first embodiment, the wing portion 1866 is provided on the portion of the bottom surface 1824 surrounding the joining hole 1822; that is, the wing portion 1866 extends from the joining hole 1822 around and covers the bottom surface 1824. Therefore, the wing portion 1866 extends on the bottom surface 1824 perpendicular to the rotation axis R1 (i.e., parallel to the first direction D1). The wing portion 1866 can also extend on the bottom surface 1824 parallel to the rotation axis R1 (i.e., parallel to the second direction D2) as required. In order to prevent the joining portion 186 from being partially upwardly deformed or overturned when pulled by an external force, the above structural configuration makes the wing portion 1866 be able to help the joining portion 186 to resist separating from the bottom plate portion 182 in all directions; however, it is not limited thereto. For example, the wing portion 1866 extends on the bottom surface 1824 only parallel to the first direction D1. This structural configuration makes the joining portion 186 abut against the portion of the bottom surface 1824 around the joining hole 1822 through the wing portion 1866 when being subjected to an upward external force, which can increase the resistance of the joining portion 186 against the separation from the bottom plate portion 182. For another example, the wing portion 1866 extends on the bottom surface 1824 only parallel to the first direction D1 toward the opening 18d, which can also increase the resistance of the joining portion 186 against the separation from the bottom plate portion 182 to a certain extent. The wing portion 1866 provides extra pulling strength, also because when the position of the bottom plate portion 182 where the wing portion 1866 is disposed is a flat surface as the flat bottom surface 1824, better be flat at both upper and bottom surfaces 1826 and 1824. If the bottom plate portion 182 is punched to form a holding recess where the wing portion 1866 is disposed, the punched area of the bottom plate portion 182 accumulates certain stress and becomes structurally weaker. Therefore the wing portion 1866 should extend outwards to an outer flat area of the bottom surface 1824 (outside the holding recess). Such flat area has both upper and bottom surfaces 1826 and 1824 be flat and unprocessed. Furthermore, the wing portion 1866 provides extra pulling strength if there has at least a corresponding part of the joining portion 186 is overlapped with the wing portion 1866 in vertical projection. That means the wing portion 1866 and such corresponding part of the joining portion 186 jointly holds a flat area of the bottom plate portion 182, by attaching to a corresponding flat part of the upper surface 1826 and bottom surface 1824. The corresponding part of the joining portion 186 may be the ribs 1868, 1878 in FIGS. 2-4 and FIGS. 13-15. It is also important that at least a portion of the wing portion 1866 extend outwards in excess of the vertical projection of the main body of various joining portions 186, 187 and 188 (e.g. the hook portions 1864, 1872, 1881a and 1881b) to provide additional pulling strength.

Please refer to FIG. 1, FIG. 6 to FIG. 9. For the support connection portion 18b, the base 18 includes a joining portion 188, alone forming the support connection portion 18b. The bottom plate portion 182 has a joining hole 1828 and two protruding bridge portions 1830. The joining hole 1828 extends in the first direction D1, and the two protruding bridge portions 1830 extend in the second direction D2. The two protruding bridge portions 1830 are disposed opposite to each other at an interval in the first direction D1 and are higher than the upper surface 1826 of the base 18. Each protruding bridge portions 1830 is connected across to two sides of the joining hole 1828, so that the joining hole 1828 is divided into three portions (from the view in the vertical direction Dv). That is, the two protruding bridge portions 1830 divide the joining hole 1828 into three exposed holes in the first direction D1, namely a side hole 1828a, a middle hole 1828b and a side hole 1828c respectively. Therein, the side hole 1828a and the middle hole 1828b are connected by the space under one protruding bridge portion 1830, and the middle hole 1828b and the side hole 1828c are connected by the space under the other protruding bridge portion 1830. The embedded portion 1862 fills up the side hole 1828a, the middle hole 1822b, the side hole 1822c, and the above two connection spaces. The joining portion 188 and the joining hole 1828 are firmly engaged with each other. The joining portion 188 encapsulates the two protruding bridge portions 1830; therein, the combination of the bottom plate portion 182 and the joining portion 188 can be regarded as one keyswitch support connection structure 180b, used for connecting with the second keyswitch support 16.

Figure 8:
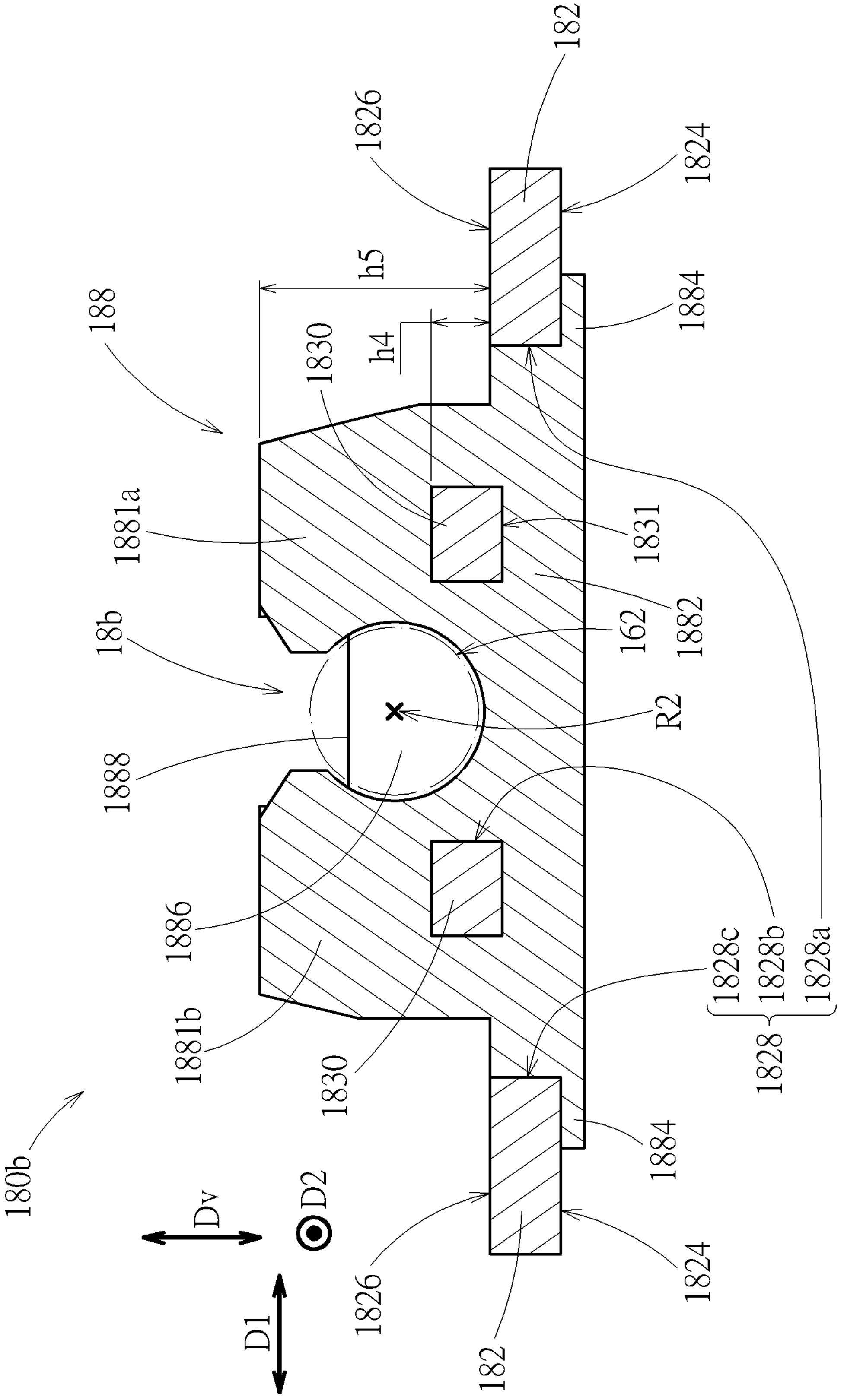
FIG. 8 is a sectional view of the base along the line Z-Z in FIG. 6.
Figure 9:
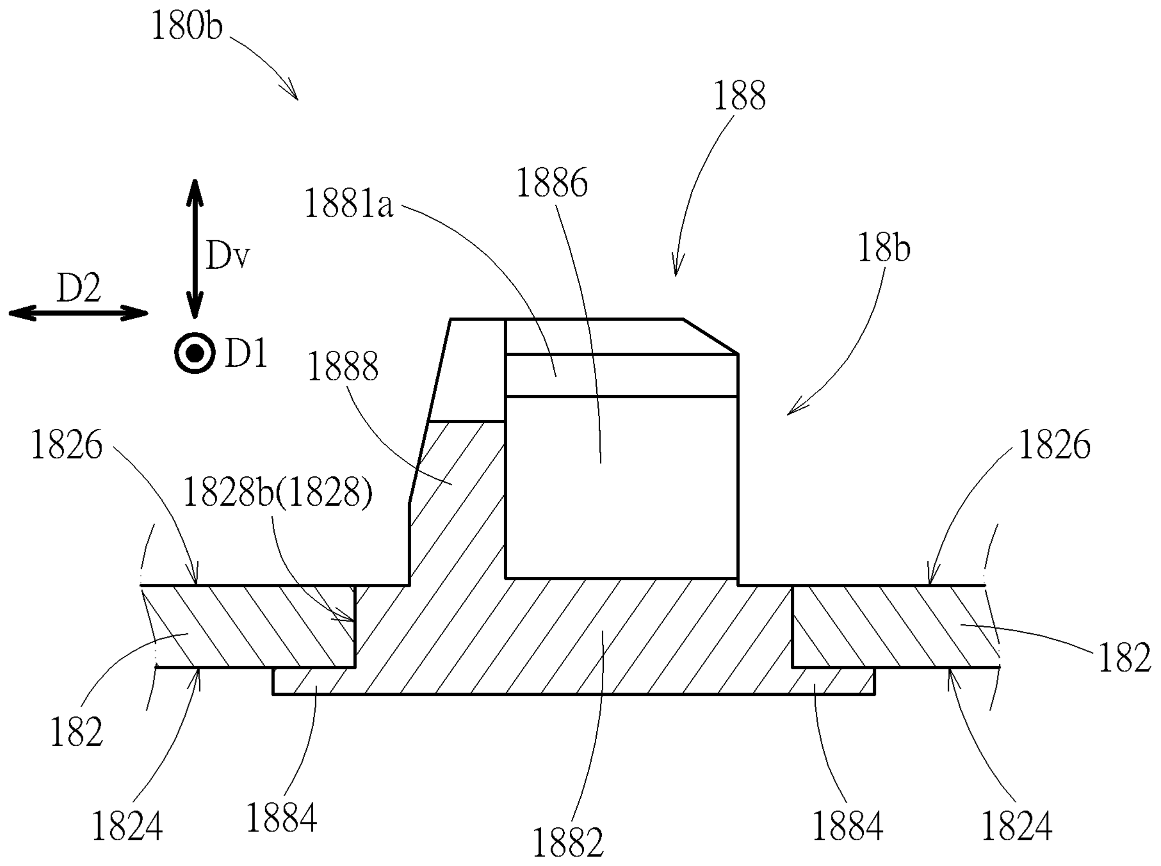
FIG. 9 is a sectional view of the base along the line W-W in FIG. 6.

In the embodiment, a shaft-shaped base connection portion 162 of the second keyswitch support 16 (which is indicated by a chain circle in FIG. 8) is pivotally connected to the joining portion 188, so that the second keyswitch support 16 can rotate around a rotation axis R2 (indicated by a chain line in FIG. 1 and by a cross mark in FIG. 8) perpendicular to the vertical direction Dv (i.e. rotating parallel to the rotation axis R2). The rotation axis R2 is parallel to the second direction D2. The two protruding bridge portions 1830 are arranged in a direction perpendicular to the rotation axis R2 (and the vertical direction Dv). The connection interfaces (shown by frames in dashed lines in FIG. 7) between the protruding bridge portion 1830 and the joining hole 1828 are not rectangular, but curved; it can increase the moment of inertia of the protruding bridge portion 1830. If the outsides of the two protruding bridge portions 1830 are closed, i.e., there is no the two side holes 1828*a* and 1828*c*, the stress is more likely to concentrate on the periphery of the middle hole 1828*b* when the joining portion 188 is pulled by a force, especially on the opposite inner edges of the two protruding bridge portions 1830, which makes the two protruding bridge portion 1830 easily deform due to the high stress. Therefore, the disposition of the two side holes 1828*a* and 1828*c* helps to disperse the stress locally from the periphery of the middle hole 1828*b* to the periphery of the two side holes 1828*a*/1828*c*. Furthermore, the widths of the two side holes 1828*a* and 1828*c* in the second direction D2 are not greater than that of the middle hole 1828*b*, which can effectively disperse the stress to the two side holes 1828*a* and 1828*c* when the joining portion 188 is pulled by a force. In the view point of FIG. 8, the central position of the second keyswitch support 16 is located at the right side of the support connection portion 18*b*. When the second keyswitch support 16 is driven to move upward (e.g., by the keycap 12 moving upward to drive the second keyswitch support 16), the base connection portion 162 will pull the joining portion 188 up and to the left. The above protruding bridge portion 1830 with the curved connection interface can increase the resistance of the protruding bridge portion 1830 to this pulling force (i.e., increasing the overall structural strength of the keyswitch support connection structure 180*b*). In addition, the height of the protruding bridge portion 1830 with the same width thereof may be close to the upper surface 1826 to avoid lowering its pulling strength. For example, as shown in FIG. 8, the bottom surface of the protruding bridge portion 1830 may be lower than the upper surface 1826 to maintain a high pulling strength under a certain width of the protruding bridge portion 1830. In addition, in the embodiment, as shown by FIG. 8, a height h4 of a middle line (indicated by a chain line in FIG. 7) for the protruding bridge portion 1830 is not higher than 50% of a height h5 of the joining portion 188, and not higher than a rotation axis (equivalent to the rotation axis R2) of the shaft recess 1886. The bottom surface 1831 of the protruding bridge portion 1830 is lower than the upper surface 1826 of the bottom plate portion 182.

The joining portion 188 includes two hook portions 1881*a* and 1881*b*, an embedded portion 1882, and a wing portion 1884. The two hook portions 1881*a* and 1881*b* disposed opposite to each other at an interval in the first direction D1. The two opposite concave wall surfaces of the two hook portions 1881*a* and 1881*b* jointly define a shaft recess 1886. The shaft recess 1886 extends in the second direction D2 (or the rotation axis R2). The shaft recess 1886 is at least partially open in the second direction D2 (or the rotation axis R2) and the vertical direction Dv. The size of the shaft recess 1886 at the opening in the vertical direction Dv, i.e., the distance between free ends of the hook portions 1881*a* and 1881*b*, is slightly smaller than the diameter of the shaft structure of the base connecting portion 162 of the second key switch support 16. The bottom ends 1881c and 1881*d* of the two hook portions 1881*a* and 1881*b*, extends at least partially to cover and adhere to the upper surface 1826. Thereby, when the joining portion 186 is pulled upward by an external force, the bottom ends 1881*c* and 1881*d* of the two hook portions 1881*a* and 1881*b* abut against the hole wall of the joining hole 1828 (including the side hole 1828*a*, the middle hole 1828*b*, and the side hole 1828*c*) and the portion of the upper surface 1826 adjacent to the joining hole 1828, so as to resist separation of the joining portion 186 from the bottom plate portion 182. The embedded 1882 fills up the joining hole 1828. The wing portion 1884 protrudes from the bottom surface 1824 and covers a portion of the bottom surface 1824 (or extends on the bottom surface 1824). The structure and effect of the wing portion 1884 of the joining portion 188 is the same as the wing portion 1866 of the joining portion 186. For other descriptions about the wing portion 1884 of the joining portion 188, please refer to the relevant descriptions of the wing portion 1886 of the joining portion 186 and variants thereof, which will not be repeated in addition. The shaft recess 1886 is rotatably connected to the base connection portion 162. In other words, the joining portion 188 independently achieves the support connection portion 18*b* through the shaft recess 1886. Furthermore, the joining portion 188 includes a side wall 1888 beside the shaft recess 1886 in the rotation axis R2. The side wall 1888 connects the two hook portions 1881*a* and 1881*b*, which can increase the structural stability between the two hook portions 1881*a* and 1881*b* inducing an improvement in the structural strength of the shaft recess 1886 and can also improve the stability of the pivotal connection between the joint 188 and the base connection 162.

Figure 2:
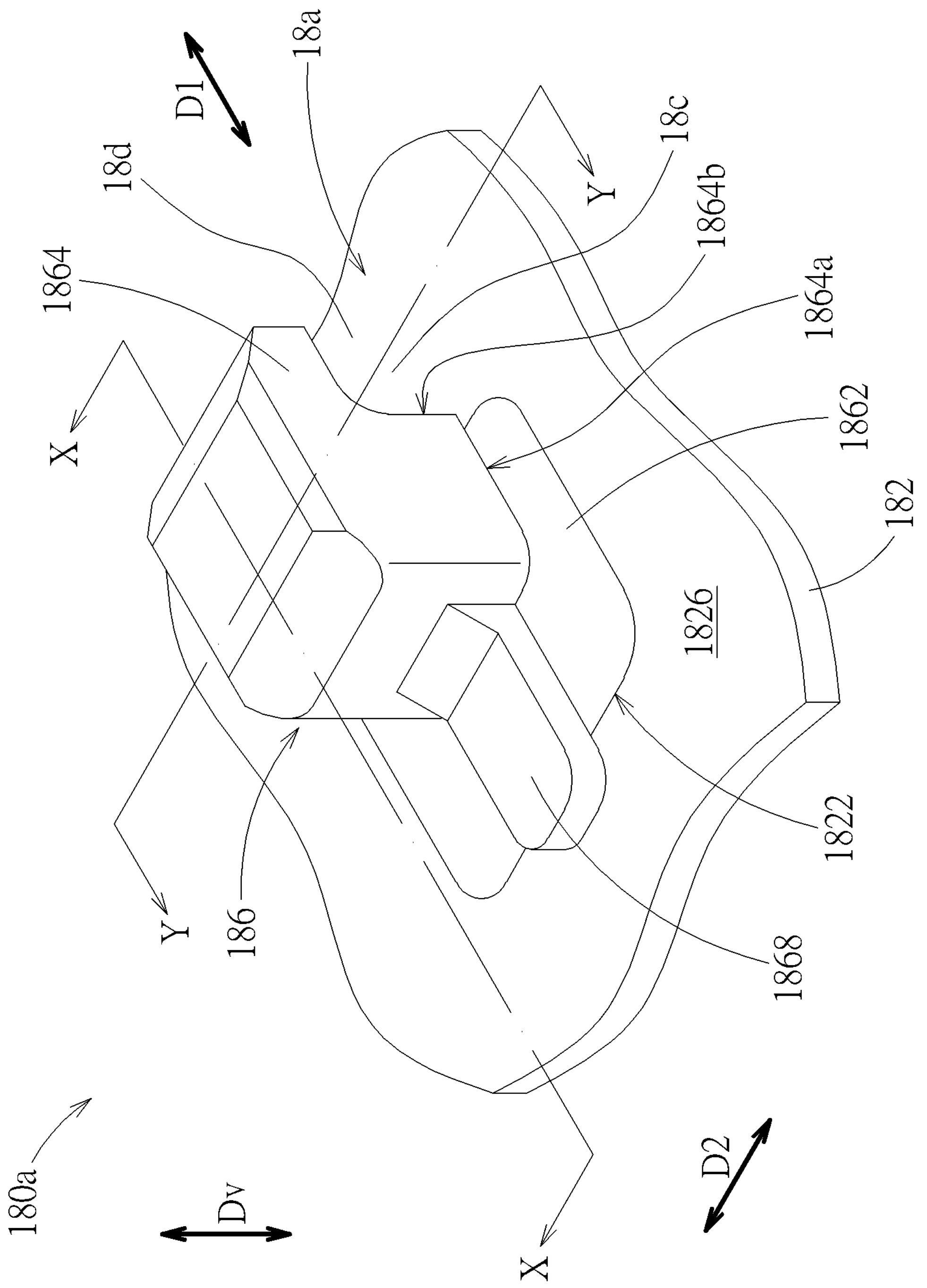
FIG. 2 is an enlarged view of the circle A in FIG. 1.
Figure 3:
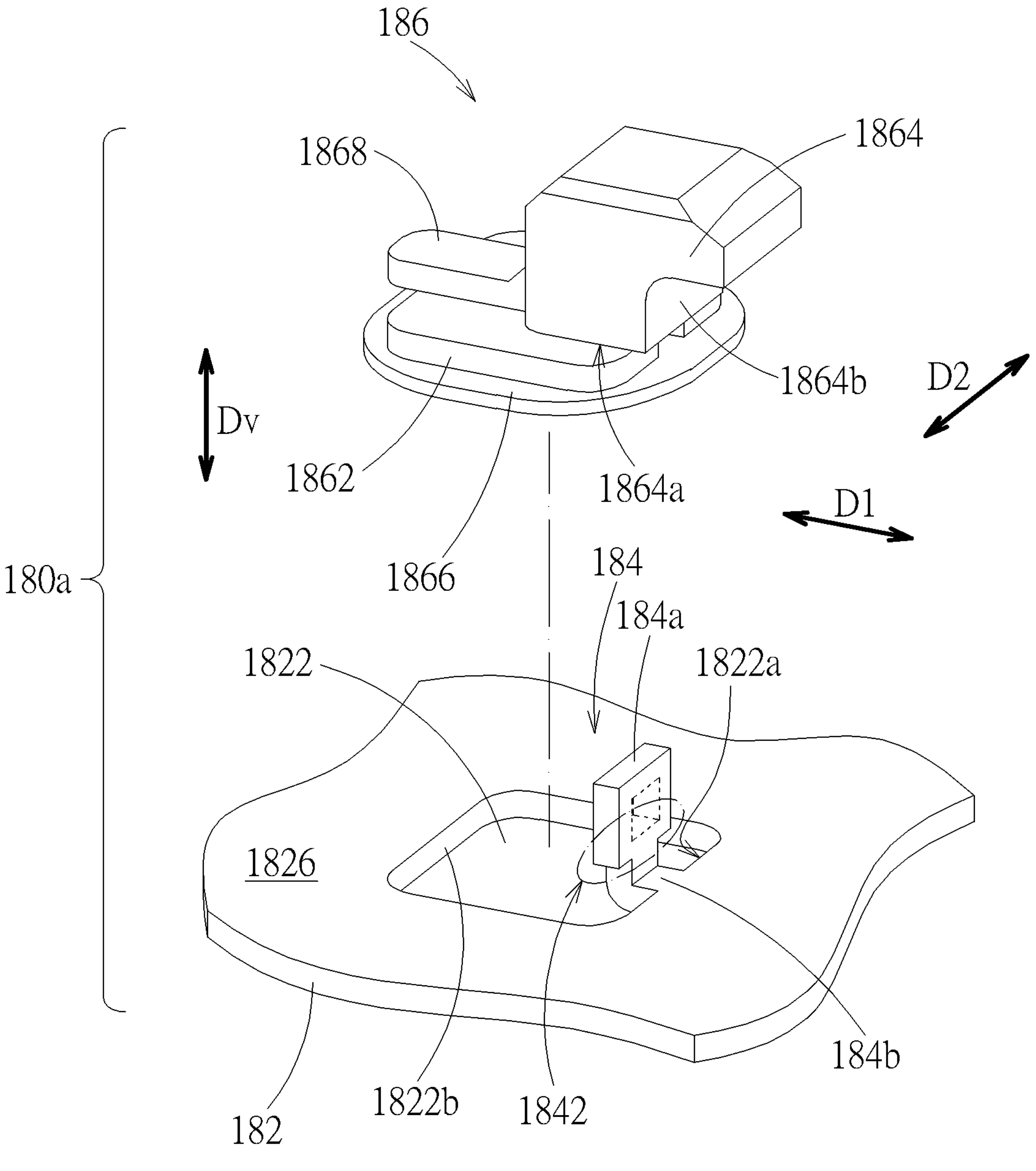
FIG. 3 is an exploded view of the base in FIG. 2.
Figure 10:
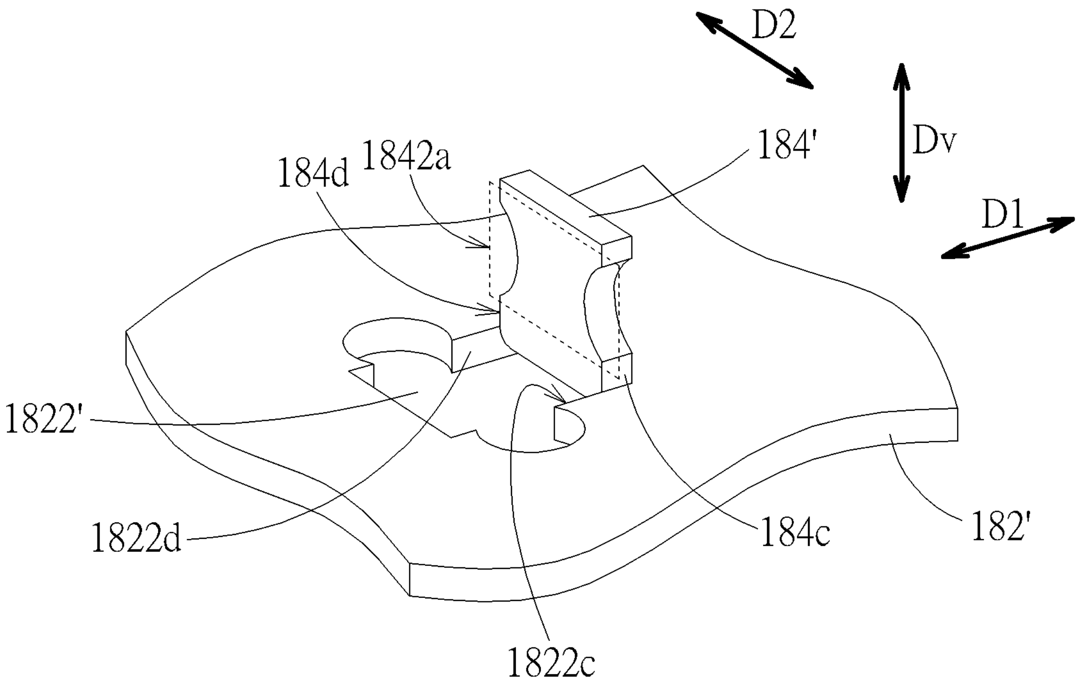
FIG. 10 is a schematic diagram illustrating a cantilever plate of a base according to a second embodiment.
Figure 11:
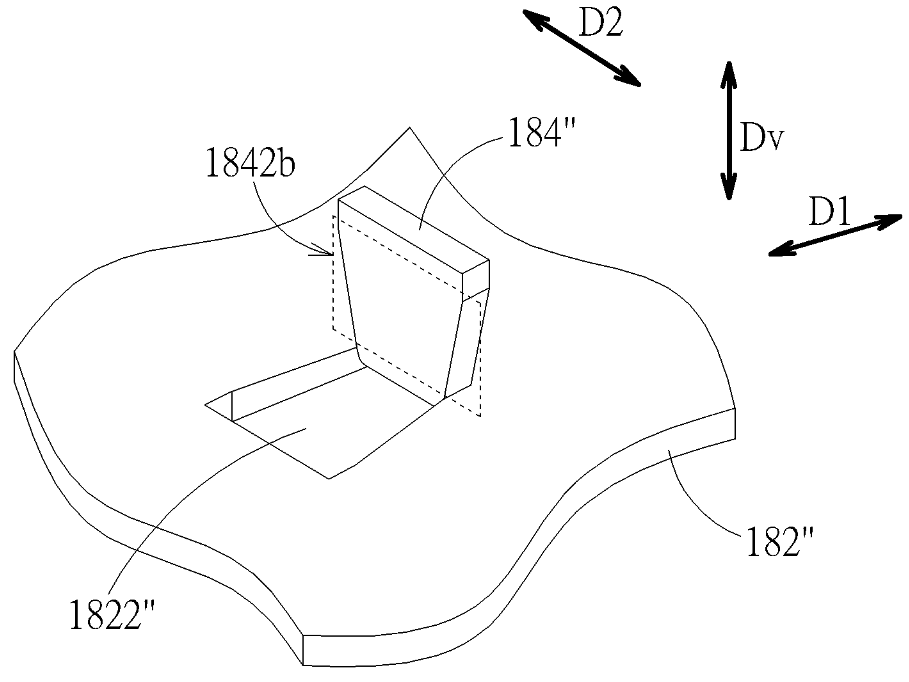
FIG. 11 is a schematic diagram illustrating a cantilever plate of a base according to a third embodiment.

In addition, in the embodiment, as shown by FIG. 3, the cantilever plate 184 has an L-shaped neck portion extending from the bottom plate portion 182 and bending upward, and a head portion connected to the L-shaped neck portion. A step between the head portion and the neck portion that is formed due to the different widths of the head portion and the neck portion can be regarded as the necking portion in structure (as the holding structure 1842). In practice, the necking portion also can be achieved by other structures. For example, as shown by FIG. 10, the necking portion of a cantilever plate 184' according to a second embodiment is formed by two notches at two sides of the cantilever plate 184' and is regarded as a holding structure 1842*a* (indicated by a frame in chain lines in the figure). Furthermore, in FIG. 10, the cantilever plate 184' has two opposite outer edges 184*c* and 184*d* from its fixed end to its free end (i.e., in the direction perpendicular to the extension direction thereof). A joining hole 1822' of the bottom plate portion 182' has two opposite side edges 1822*c* and 1822*d* in a direction perpendicular to the first direction D1. The two outer edges 184*c* and 184*d* are directly connected to the two side edges 1822*c* and 1822*d* respectively. Such structural feature is conducive to increasing the structural strength of the cantilever plate 184' itself. For another example, as shown by FIG. 11, a cantilever plate 184" according to a third embodiment includes an inverted trapezoid structure, the width of which decreases from top to bottom. Therefore, the entire inverted trapezoidal structure can be regarded as a necking portion to be used as a holding structure 1842*b* (indicated by a frame in chain lines in the figure). Furthermore, in FIG. 11, the profile of a joining hole 1822" of the bottom plate portion 182" is the same as the profile of the cantilever plate 184" (for example by directly punching a sheet metal parts without leaving any clearance). Such structural feature can reduce the plate area of the base 18 occupied by the joining hole 1822" and the joining portion (not shown in FIG. 11; please refer to the joining portions 18*a* and 18*b* in FIG. 1 to FIG. 9), reduce the volumes of the joining portions 18*a* and

18*b*, reduce the interference between the joint portions 18*a* and 18*b* and other components, and increase the structural strength of the cantilever plate 184" itself.

Figure 12:
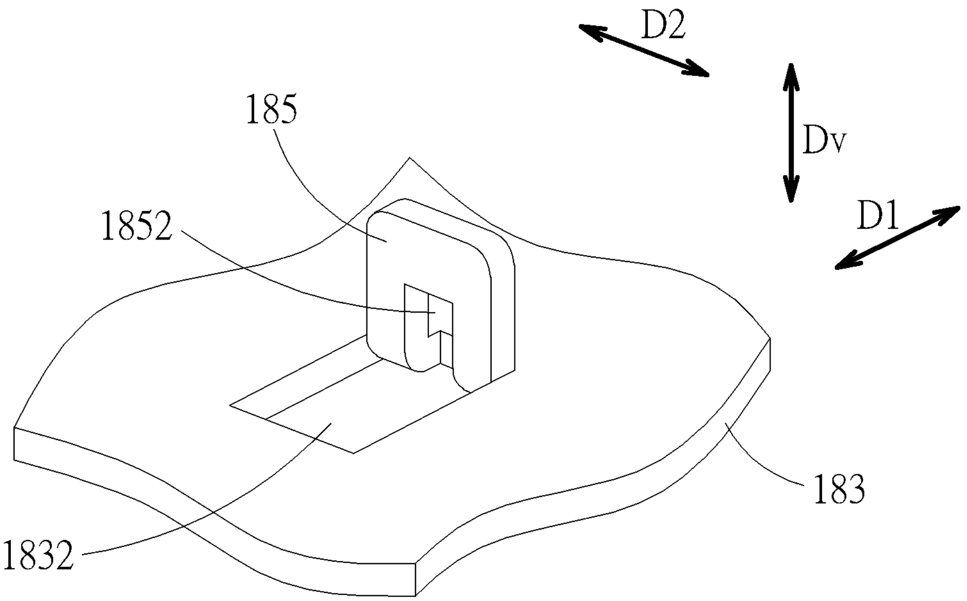
FIG. 12 is a schematic diagram illustrating a cantilever plate of a base according to a fourth embodiment.

Furthermore, in the first embodiment, as shown by FIG. 3, the holding structure 1842 increases its bonding strength with the joining portion 186 through a necking portion; however, it is not limited thereto in practice. For example, as shown by FIG. 12, a holding structure 1852 of a cantilever plate 185 according to a third embodiment includes a through hole (passing through the cantilever plate 185 parallel to the bottom plate portion 183). The holding structure 1852 increases its bonding strength with the joining portion 186 (in FIG. 3) through the through hole. The through hole can also be applied to the head of the cantilever plate 184 (as shown by the dashed lines in FIG. 3). Furthermore, as shown in FIG. 12, the profile of the cantilever plate 185 is the same as the joining hole 1832 of the bottom plate portion 183, which is conducive to increasing the structural strength of the cantilever plate 185.

Figure 13:
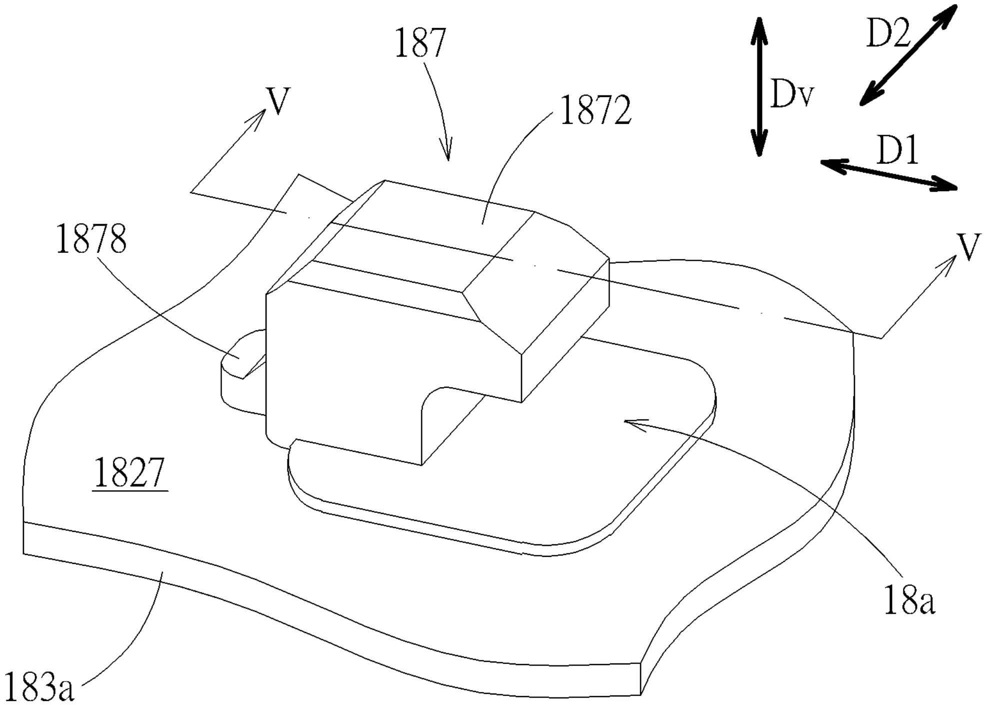
FIG. 13 is a schematic diagram illustrating a keyswitch support connection structure according to a fifth embodiment.
Figure 14:
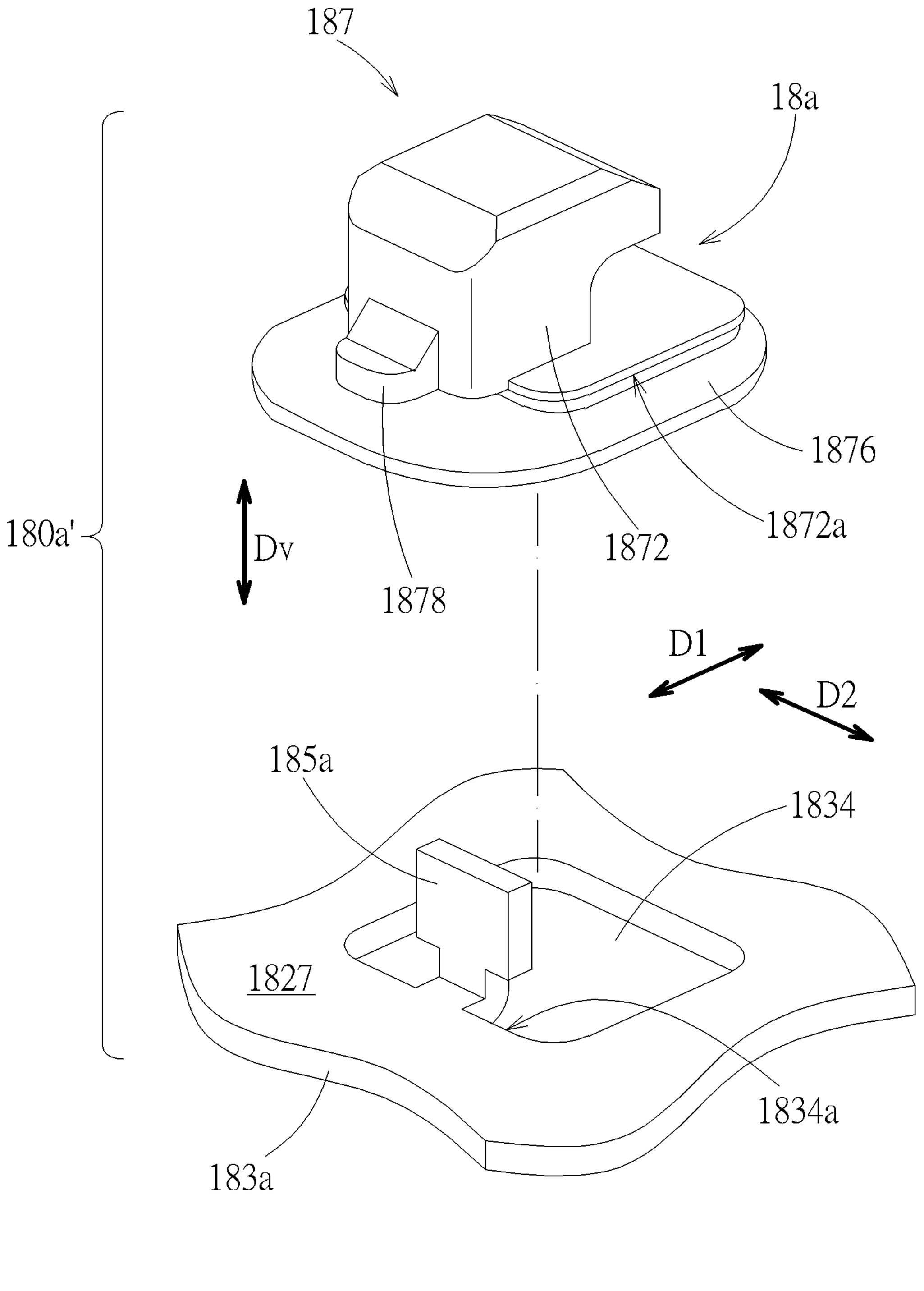
FIG. 14 is an exploded view of the keyswitch support connection structure in FIG. 13.
Figure 15:
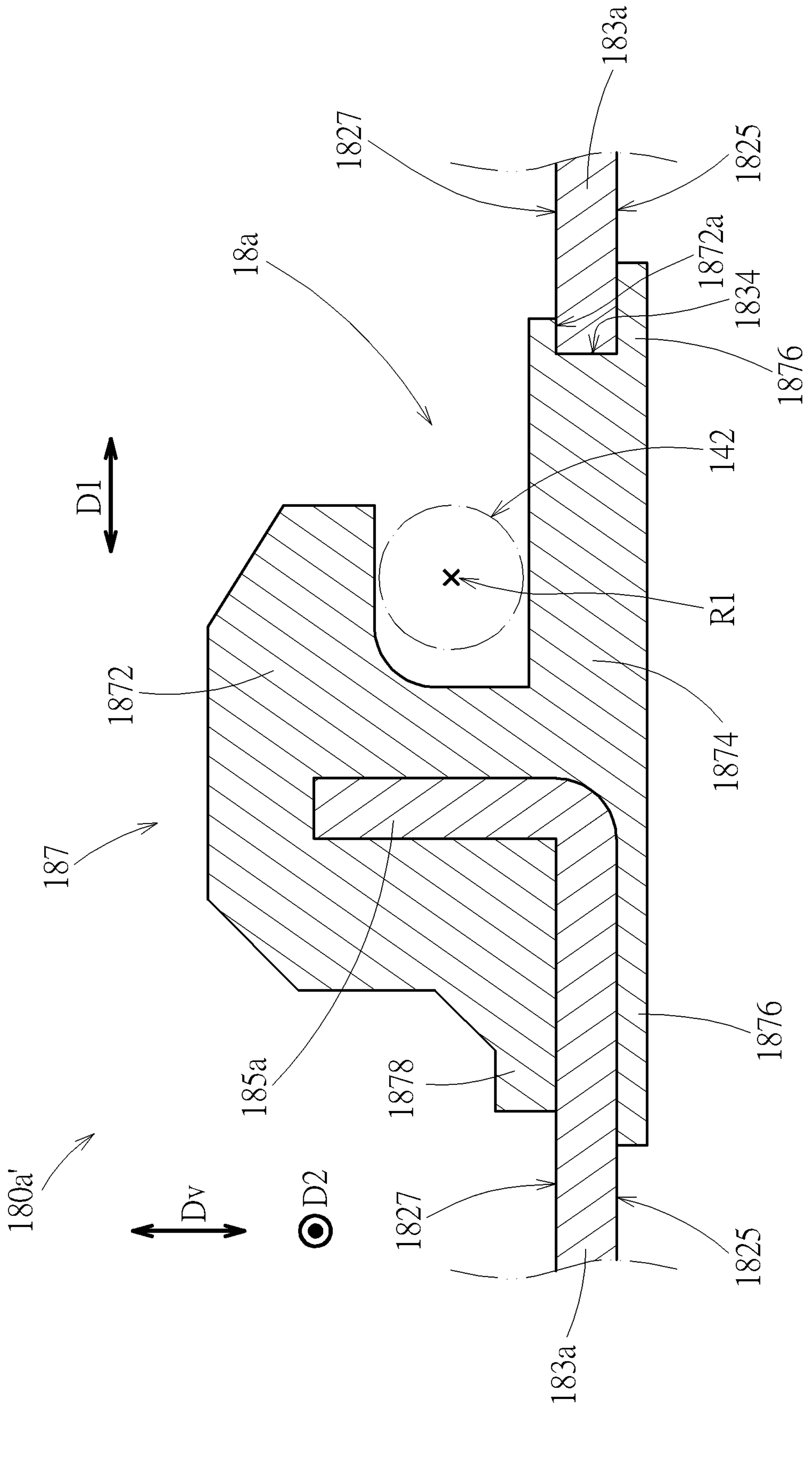
FIG. 15 is a sectional view along the line V-V in FIG. 13.

In addition, in the first embodiment, as shown by FIG. 2 and FIG. 4, the joining portion 186 and the bottom plate portion 182 jointly form the support connection portion 18*a*; however, it is not limited thereto in practice. For example, as shown by FIG. 13 to FIG. 15, a joining portion 187 according to a fifth embodiment has a hook portion 1872, an embedded portion 1874, and a wing portion 1876 which are connected up and down. The hook portion 1872 has a contacting surface 1872*a* at its bottom and at least partially closely adheres to an upper surface 1827 of the bottom plate portion 183*a* through the contacting surface 1872*a*. The embedded portion 1874 fills up the joining hole 1834 of the bottom plate portion 183*a*. The wing portion 1876 closely adheres to a bottom surface 1825 of the bottom plate portion 183*a*. The projection of the contacting surface 1872*a* in the vertical direction Dv is located within the projection of the wing portion 1876 in the vertical direction Dv. Thereby, even if the wing portion 1876 is thin, the large distribution area of the wing portion 1876 can still increase the resistance of the joining portion 187 against the separation from the bottom plate portion 183*a*.

Furthermore, in this embodiment, the joining portion 187 independently forms the support connection portion 18*a* (in which the combination of the bottom plate portion 183*a*, the cantilever plate 185*a*, and the joining portion 187 can be regarded as one keyswitch support connection structure 180*a*'). Furthermore, the cantilever plate 185*a* extends upward from a side edge 1834*a* of the joining hole 1834 of the bottom plate portion 183*a* that is relatively away from the opening direction of the hook portion 1872 in the first direction D1. The joining portion 187 includes a rib 1878 extending in the first direction at its rear side. The rib 1878 adheres to the upper surface 1827 of the bottom plate portion 183*a*. The rib 1878 is not located within the projection of the joining hole 1834, and is not connected with the embedded portion 1874 that fills up the joining hole 1834, but the rib 1878 and a part of the wing portion 1876 jointly clamp the bottom plate portion 183*a* up and down. The ribs 1868 and 1878 may has a width narrower than the joining portions 186 and 187 to save space for better accommodating the first and second keyswitch supports 14 and 16 when the keycap 12 moves downwards.

In addition, in the first embodiment, the structure (including one cantilever plate 184) for joining the joining portion 186 (used for forming the keyswitch support connection structure 180*a*) with the bottom plate portion 182 is not the same as the structure (including two protruding bridge portions 1830) for joining the joining portion 188 (used for forming the keyswitch support connection structure 180*b*) with the bottom plate portion 182; however, it is not limited thereto in practice. For example, for the support connection portion 18*a*, the cantilever plate 184 and the wing portion 1866 of the joining portion 186 can be implemented alternatively. For the support connection portion 18*a*, the bottom plate portion 182 can be provided with a structure like the protruding bridge portion 1830 at the left side of the joining hole 1822; therein, the joining portion 186 also encapsulates the structure. For another example, for the support connection portion 18*a*, the cantilever plate 184 is replaced with a structure like the protruding bridge portion 1830 (spanning the joining hole 1822); therein, the joining portion 186 also encapsulates the structure. For another example, for the support connection portion 18*b*, one or two protruding bridge portions 1830 are structures like the cantilever plate 184 (or variants thereof) respectively (extending upwards from both sides of the joining hole 1828 respectively); therein, the joining portion 188 also encapsulates the structure.

Specifically, the above-mentioned cantilever plates 184, 184', 184", 185 and 185*a* of the above embodiments are not limited to applied to the support connection portion 18*a* or joining portions 186 and 187 of the above embodiments. The cantilever plates 184, 184', 184", 185 and 185*a* also can be applied to the support connection portion 18*b* or joining portion 188 in FIG. 6 to FIG. 9.

Figure 6:
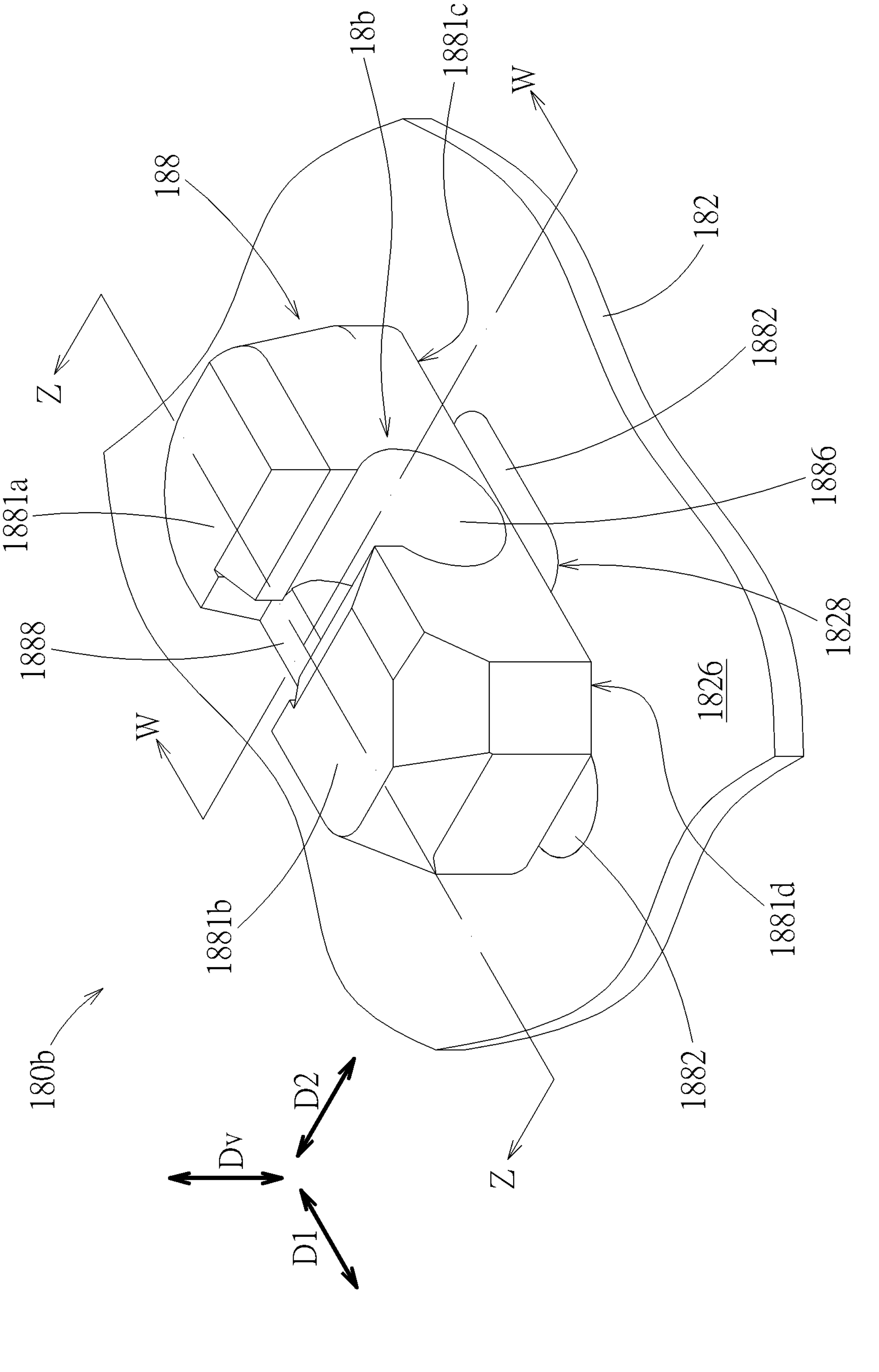
FIG. 6 is an enlarged view of the circle B in FIG. 1.
Figure 7:
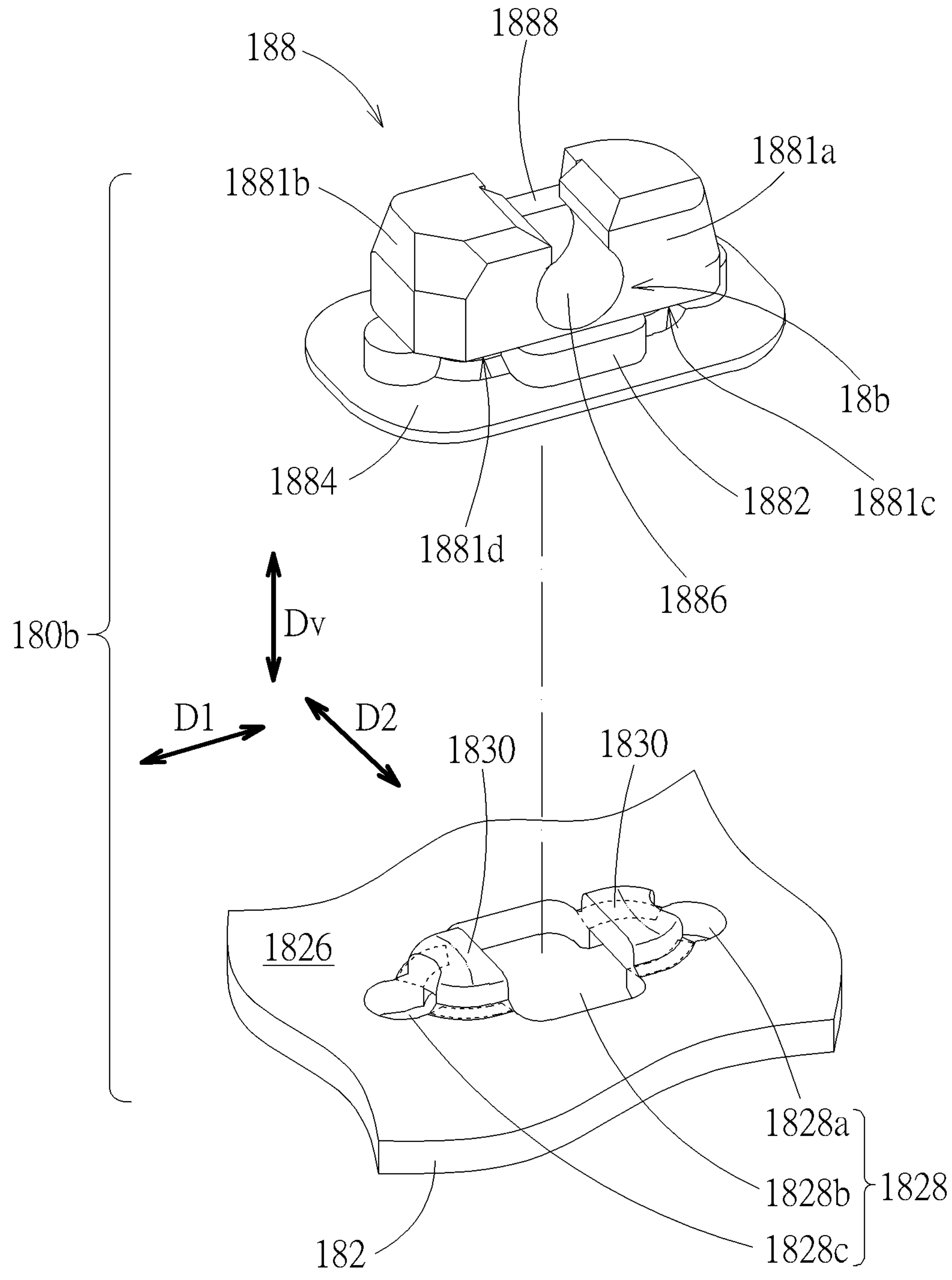
FIG. 7 is an exploded view of the base in FIG. 6.
Figure 16:
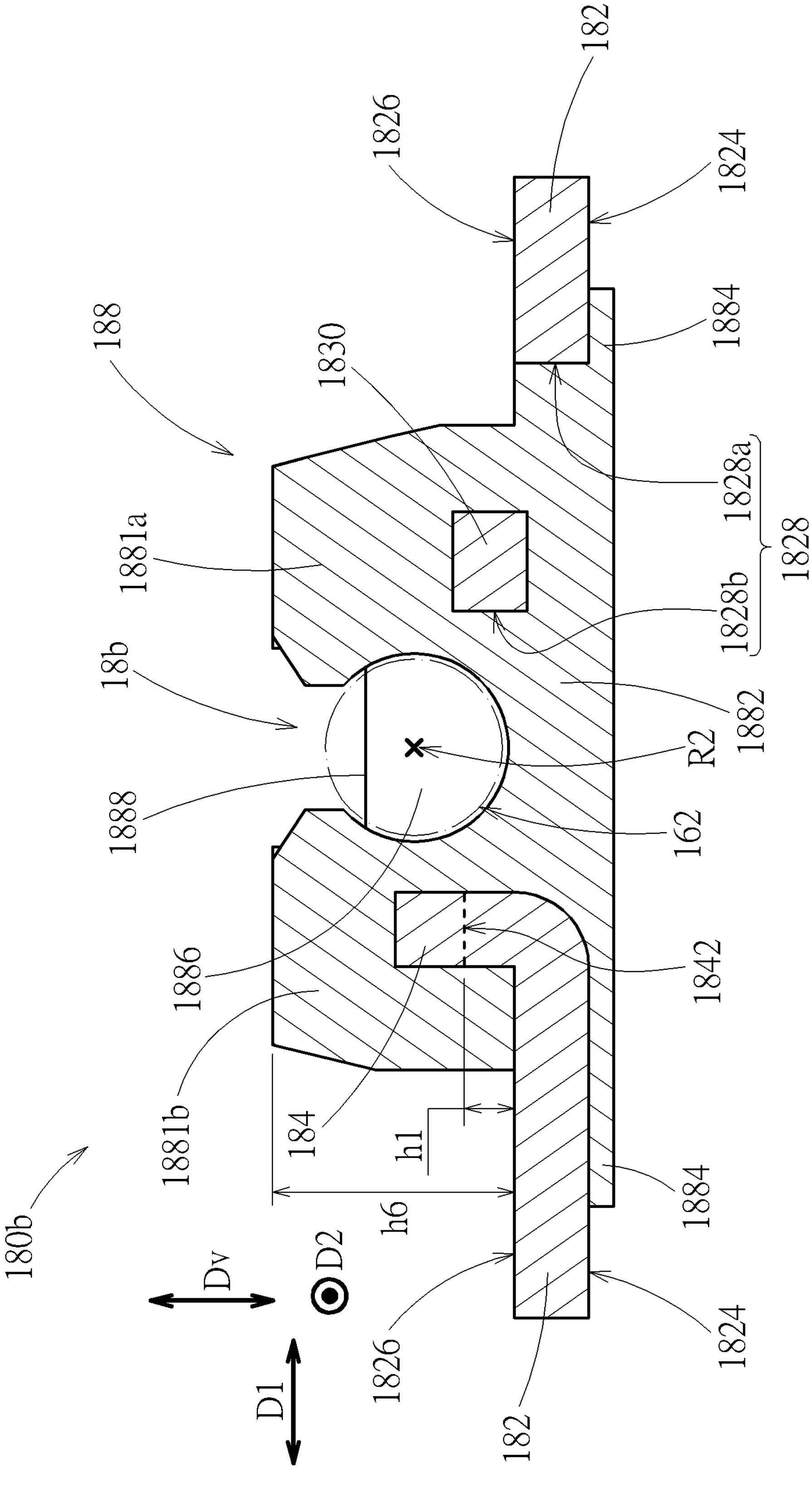
FIG. 16 is a sectional view of a keyswitch support connection structure according to a sixth embodiment.
Figure 17:
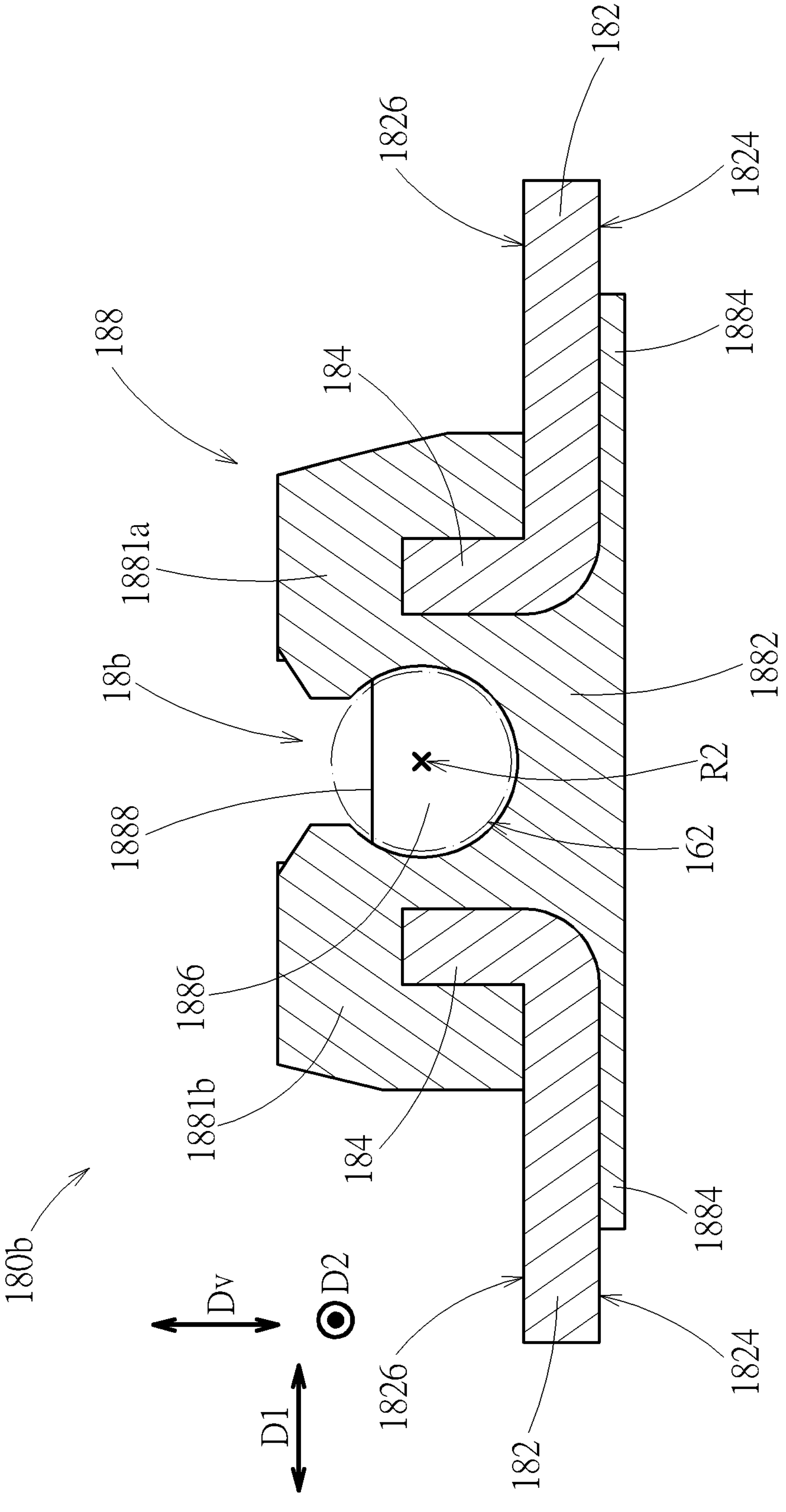
FIG. 17 is a sectional view of a keyswitch support connection structure according to a seventh embodiment.

Please refer to FIG. 16 and FIG. 17, which are sectional views of sixth and seventh embodiments respectively, and of which the positions of the cutting plans are equivalent to the line Z-Z in FIG. 6. In FIG. 16 and FIG. 17, most of the components correspond to those of the embodiment shown by FIG. 8. The components and structures with the same component names or reference numbers have the same or similar technical features, which will not be repeated herein.

In FIG. 16, the left protruding bridge portion 1830 in FIG. 8 is replaced with one of the cantilever plates 184, 184', 184", 185 and 185*a*. That is, the hook portion 1881*a* and the embedded portion 1882 still encapsulate the entire right the protruding bridge portion 1830, and the hook portion 1881*b* is changed to encapsulate the entire cantilever plate 184 on the left in FIG. 16 (or one of the cantilever plates 184', 184", 185 and 185*a*). The cantilever plate 184 (or 184', 184", 185 and 185*a*) bends from the first direction D1 to the vertical direction Dv and extends. Similarly, the height h1 for the holding structure 1842 (the hidden profile of which is shown by a dashed line) is not higher than 50% of the height h6 of the joining portion 188; the height h1 for the holding structure 1842 is not higher than a rotation axis (equivalent to the rotation axis R2) of the shaft recess 1886.

The structural configuration shown by FIG. 16 makes the joining portion 188 with two hook portions 1881*a* and 1881*b* join with the bottom plate portion 182 through one cantilever plate 184 (or 184', 184", 185 and 185*a*) and one protruding bridge portion 1830. Basically the cantilever plate 184 (or 184', 184", 185 and 185*a*) has its plane face the shaft recess 1886 and the protruding bridge portion 1830, with the shaft recess 1886 formed between the cantilever plate 184 (or 184', 184", 185 and 185*a*) and the protruding bridge portion 1830. The support connection portion 18*b* formed by the two hook portions 1881*a* and 1881*b* of the joining portion 188 can provide high-strength pull-out resistance through the cantilever plate 184 (or 184', 184", 185 and 185*a*) and the protruding bridge portion 1830.

Similarly, in FIG. 17, each of the two protruding bridge portions 1830 in FIG. 8 are replaced with one of the cantilever plates 184, 184', 184", 185 and 185*a*. The hook portion 1881*a*, the hook portion 1881*b*, and the embedded portion 1882 completely encapsulate the two cantilever plates 184 (or 184', 184", 185 and 185*a*). Each cantilever plate 184 (or 184', 184", 185 and 185*a*) bend from the first direction D1 to the vertical direction Dv and extend. Basically the two cantilever plates 184 (or 184', 184", 185 and 185*a*) have their planes face each other and meanwhile both face the shaft recess 1886 between the two cantilever plates 184 (or 184', 184", 185 and 185*a*).

The structural configuration shown by FIG. 17 makes the joining portion 188 with two hook portions 1881*a* and 1881*b* join with the bottom plate portion 182 through two cantilever plates 184 (or 184', 184", 185 and 185*a*). The support connection portion 18*b* formed by the two hook portions 1881*a* and 1881*b* of the joining portion 188 can provide high-strength pull-out resistance through the two cantilever plates 184 (or 184', 184", 185 and 185*a*).

Figure 18:
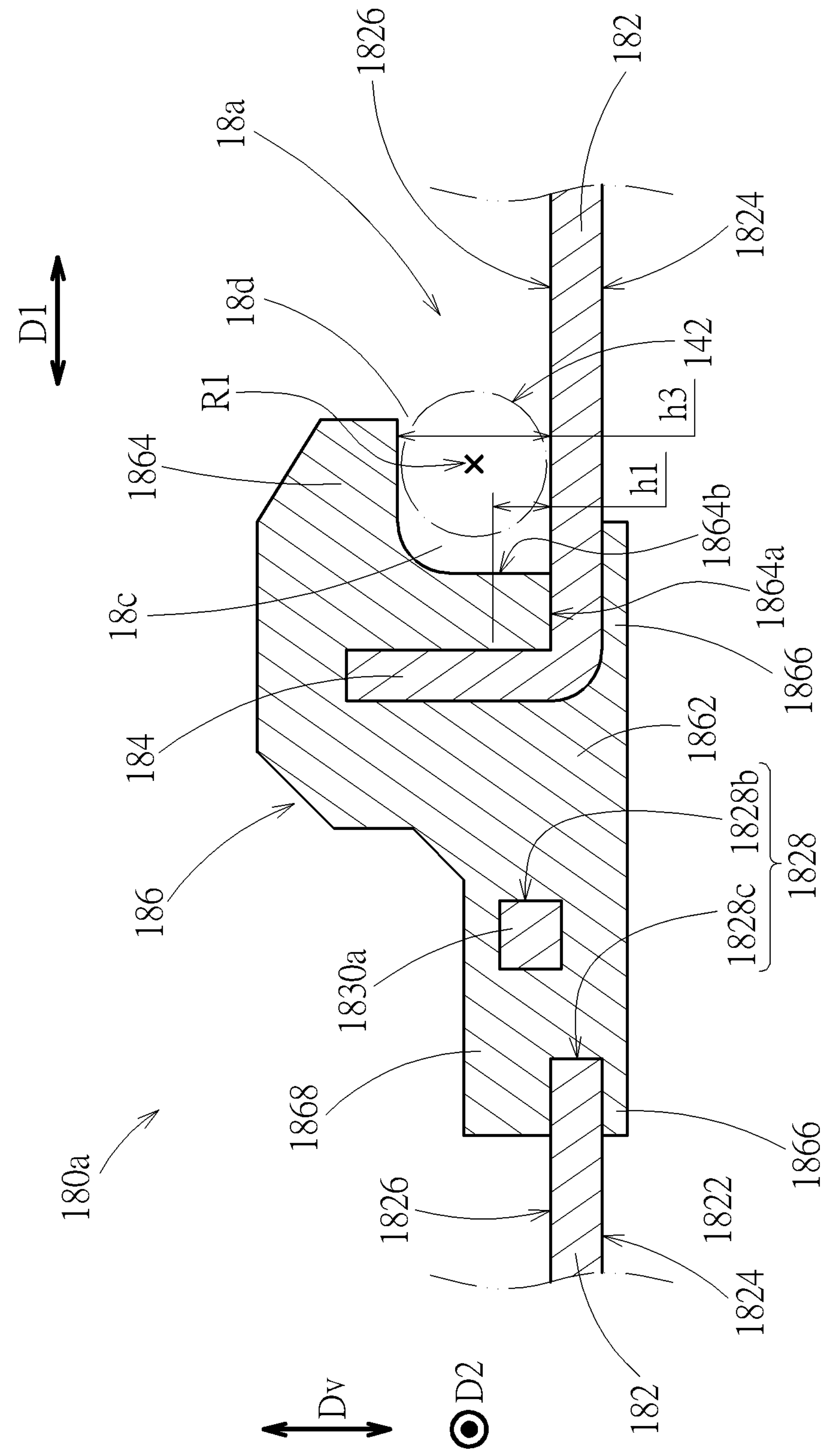
FIG. 18 is a sectional view of a keyswitch support connection structure according to an eighth embodiment.

Please refer to FIG. 18, which is a sectional view of an eighth embodiment, and of which the position of the cutting plan is equivalent to the line X-X in FIG. 2. FIG. 18 is roughly similar to the embodiment corresponding to FIG. 4. The difference relative to FIG. 4 is that the joining hole 1822 (referring FIG. 4) is further provided with a protruding bridge portion 1830*a* (i.e., the protruding bridge portion 1830 in FIG. 7 and FIG. 8). The protruding bridge portion 1830*a* is connected across two sides of the joining hole 182, which divides the joining hole 1822 into two portions from the view in the vertical direction Dv. That is, the protruding bridge portion 1830*a* divides the joining hole 1822 into exposed middle hole 1822*b* and side hole 1822*c* in the first direction D1. The middle hole 1822*b* and the side hole 1822*c* are connected by the space under the protruding bridge portion 1830*a*. The embedded portion 1862 fills up the middle hole 1822*b*, the side hole 1822*c*, and the connection space. In the embodiment, the cantilever plate 184 is closer to the hook portion 1864, and the protruding bridge portion 1830*a* is closer to the rear side of the joining portion 186 and the rib 1868. If needed, it is alternatively practicable that the cantilever plate 184 can be closer to the rear side of the joining portion 186 and the rib 1868 while the protruding bridge portion 1830*a* is closer to the hook portion 1864. Similarly, the height h4 for the protruding bridge portion 1830*a* is not higher than a half of the slot height h3 of the sliding slot 18*c*.

Furthermore, regardless of whether the wing portions 1866, 1876 and 1884 in the above embodiments, are attached to the bottom surfaces 1824 and 1825 or the upper surfaces 1826 and 1827, the larger the area of the wing portions 1866, 1876 and 1884 is, the better the wing portions 1866, 1876 and 1884 can resist an upward external force to a certain extent and prevent the joining portion 186 from separating from the bottom plate portions 182 and 183*a*. However, the outer size of oversized wing portions 1866, 1876 and 1884 will limit the configuration of other components or backlight effect in the keyswitch structure 1. The design of the wing portions 1866, 1876 and 1884 needs to consider the overall functional performance of the keyswitch structure 1 and avoid interference with surrounding components.

Although the keyswitch support connection structures 180*a*, 180*a'* and 180*b* of the above embodiments focus on resisting pulling external forces, modern automated assembly processes may adopt assembly that involves interference with the above various joining portions 186, 187 and 188 (e.g. the hook portions 1864, 1872, 1881*a* and 1881*b*) during the installation of the first keyswitch support 14 and/or the second keyswitch support 16. The coordinating configurations of the protruding bridge portions 1830 and 1830*a*, the ribs 1868 and 1878, the bottom surface of the hook portion 1872, the wing portions 1866, 1876 and 1884, and the cantilever plates 184, 184', 184", 185 and 185*a* of the above embodiments also help to enhance the structural resistance of the keyswitch support connection structures 180*a*, 180*a'* and 180*b* when assembling the first keyswitch support 14 and/or the second keyswitch support 16 the keyswitch support connection structures 180*a*, 180*a'* and 180*b*.

In addition, both the cantilever plates 184, 184', 184", 185 and 185*a* or the protruding bridge portions 1830 and 1830*a* are extended micro structures mechanically processed from the bottom plate portions 182, 182', 182", 183 and 183*a*. The higher or longer such extended micro structures are processed, the more shear stress has been applied thereto, which means the cantilever plates 184, 184', 184", 185 and 185*a* or the protruding bridge portions 1830 and 1830*a* could be too weak to support the joining portions 186, 187 and 188 from deformation or separation by external pulling forces.

Therefore, it would be better if the height of the middle line for each of the protruding bridge portions 1830 and 1830*a* is not higher than 50% or 75% of the total height of the joining portions 186, 187 and 188. Each of the protruding bridge portions 1830 and 1830*a* provides sufficient pulling strength when, the height of its middle line is proximate to or even lower than the middle line of the total height of the joining portions 186, 187 and 188, or proximate to or lower than the middle line of the sliding slot 18*c* or the shaft recess 1886.

Similarly, it would be better if the height of the middle line for each of the holding structure 1842, 1842*a*, 1842*b* and 1852 of the cantilever plates 184, 184', 184", 185 and 185*a* is not higher than 50% or 75% of the total height of the joining portions 186, 187 and 188. Each of the holding structure 1842, 1842*a*, 1842*b* and 1852 of the cantilever plates 184, 184', 184", 185 and 185*a* provides sufficient pulling strength when, the height of its middle line is proximate to or lower than the middle line of the total height of the joining portions 186, 187 and 188, or proximate to or lower than the middle line of the sliding slot 18*c* or the shaft recess 1886.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch support connection structure, comprising:

a bottom plate portion, the bottom plate portion having a joining hole, a bottom surface, and an upper surface opposite to the bottom surface;

a cantilever plate, the cantilever plate being a single-planar structure, extending upward from the joining hole, and having a holding structure; and a joining portion, the joining portion and the joining hole being firmly engaged with each other, the joining portion encapsulating the holding structure, the joining portion and the bottom plate portion jointly forming or the joining portion alone forming a support connection portion on the upper surface, wherein the joining portion has a wing portion protruding from the bottom surface and extending parallel to the bottom surface.

2. The keyswitch support connection structure according to claim 1, wherein the cantilever plate has a fixed end and a free end, the cantilever plate is fixed to the bottom plate portion through the fixed end, and the holding structure is a necking portion of the cantilever plate and is located between the fixed end and the free end.

3. The keyswitch support connection structure according to claim 1, wherein the holding structure is a through hole passing through the cantilever plate parallel to the bottom plate portion.

4. The keyswitch support connection structure according to claim 1, wherein the support connection portion has a sliding slot, the sliding slot extends in a first direction parallel to the bottom plate portion and has an opening for a keyswitch support to enter the sliding slot to be slidably connected with the support connection portion in the first direction.

5. The keyswitch support connection structure according to claim 4, wherein the joining hole has two opposite side edges in the first direction, and the cantilever plate extends upward from one of the side edges which is closer to the opening than the other side edge.

6. The keyswitch support connection structure according to claim 4, wherein the cantilever plate has two opposite outer edges from the fixed end to the free end, the joining hole has two opposite side edges in a direction perpendicular to the first direction, and the two outer edges are connected with the two side edges respectively.

7. The keyswitch support connection structure according to claim 4, wherein the joining portion has a rib extending parallel to the first direction, and the rib at least partially extends on the upper surface of the bottom plate portion.

8. The keyswitch support connection structure according to claim 1, a keyswitch support being rotatably connected with the support connection portion relative to a rotation axis, wherein the wing portion extends perpendicular to the rotation axis on the bottom surface.

9. The keyswitch support connection structure according to claim 1, a keyswitch support being rotatably connected with the support connection portion relative to a rotation axis, wherein the wing portion extends parallel to the rotation axis on the bottom surface.

10. The keyswitch support connection structure according to claim 1, wherein the joining portion has a contacting surface closely adhering to the upper surface, and a projection of the contacting surface in a vertical direction perpendicular to the upper surface is located within a projection of the wing portion in the vertical direction.

11. A keyswitch structure, comprising:

a base, comprising a keyswitch support connection structure;

a keycap disposed above the base;

a first keyswitch support connected to and between the keycap and the base; and a second keyswitch support connected to and between the keycap and the base, the keycap being vertically movable relative to the base through the first keyswitch support and the second keyswitch support;

wherein the keyswitch support connection structure comprises:

a bottom plate portion, the bottom plate portion having a joining hole, a bottom surface, and an upper surface opposite to the bottom surface;

a cantilever plate, the cantilever plate being a single-planar structure, extending upward from the joining hole, and having a holding structure; and a joining portion, the joining portion and the joining hole being firmly engaged with each other, the joining portion encapsulating the holding structure, the joining portion and the bottom plate portion jointly forming or the joining portion alone forming a support connection portion, the first keyswitch support being rotatably connected to the support connection portion on the upper surface, wherein the joining portion has a wing portion protruding from the bottom surface and extending parallel to the bottom surface.

12. The keyswitch structure according to claim 11, wherein the support connection portion has a shaft recess or a sliding slot, through which the first keyswitch support is rotatably connected to the support connection portion, and a height of a middle line for the holding structure is not higher than 50% of a height of the joining portion.

13. The keyswitch structure according to claim 11, wherein the cantilever plate has a fixed end and a free end, the cantilever plate is fixed to the bottom plate portion through the fixed end, and the holding structure is a necking portion of the cantilever plate and is located between the fixed end and the free end.

14. The keyswitch structure according to claim 11, wherein the support connection portion has a sliding slot, the sliding slot extends in a first direction parallel to the bottom plate portion and has an opening for the first keyswitch support to enter the sliding slot to be slidably connected with the support connection portion in the first direction, the joining hole has two opposite side edges in the first direction, and the cantilever plate extends upward from one of the side edges which is closer to the opening than the other side edge.

15. The keyswitch structure according to claim 11, wherein the support connection portion has a sliding slot, the sliding slot extends in a first direction parallel to the bottom plate portion and has an opening for the first keyswitch support to enter the sliding slot to be slidably connected with the support connection portion in the first direction, the joining portion has a rib extending parallel to the first direction, and the rib at least partially extends on the upper surface of the bottom plate portion.

16. The keyswitch structure according to claim 11, wherein the joining portion has a contacting surface closely adhering to the upper surface, and a projection of the contacting surface in a vertical direction perpendicular to the upper surface is located within a projection of the wing portion in the vertical direction.

* * * * *